United States Patent [19]

Degen et al.

[11] Patent Number: 5,128,041

[45] Date of Patent: Jul. 7, 1992

[54] MICROPOROUS MEMBRANE, METHOD OF MANUFACTURE, AND METHOD OF USE

[75] Inventors: Peter J. Degen, Huntington; Thomas C. Gsell, Glen Cove; Jeffrey K. Chambers, Huntington, all of N.Y.

[73] Assignee: Pall Corporation, Glen Cove, N.Y.

[21] Appl. No.: 700,252

[22] Filed: May 15, 1991

[51] Int. Cl.⁵ .............................................. B01D 71/56
[52] U.S. Cl. .................................. 210/638; 210/651; 210/490; 210/500.38
[58] Field of Search ................... 428/290; 210/500.38, 210/490, 638, 650, 651, 652; 427/245, 246; 264/41, 49

[56] References Cited

U.S. PATENT DOCUMENTS

| | | | |
|---|---|---|---|
| 3,698,931 | 11/1972 | Horowitz | 117/47 R |
| 3,862,059 | 1/1975 | Greco et al. | 525/157 |
| 4,431,545 | 2/1984 | Pall et al. | 210/500.38 X |
| 4,693,985 | 9/1987 | Degen et al. | 210/500.38 X |
| 4,702,840 | 11/1987 | Degen et al. | 210/638 |
| 4,758,239 | 7/1988 | Yeo et al. | 428/290 X |
| 4,968,533 | 11/1990 | Gsell | 210/500.38 X |

*Primary Examiner*—Frank Spear
*Attorney, Agent, or Firm*—Leydig, Voit & Mayer

[57] ABSTRACT

Microporous membranes having positive zeta potentials in alkaline pH are provided by radiation grafting diallyldimenthylammonium dimethyl ammonium chloride to the surraces of a microporous, polyamide membrane using ionizing radiation. The membranes have particular use in microelectronics manufacture where quick rinse up times with ultrapure water are required.

27 Claims, No Drawings

MICROPOROUS MEMBRANE, METHOD OF MANUFACTURE, AND METHOD OF USE

TECHNICAL FIELD

The present invention relates to microporous membranes, their preparation, and their use. In particular, the invention relates to novel microporous polymeric membranes with enhanced filtration efficiencies for the removal of fine particulates and colloids. More particularly, the invention relates to novel microporous polymeric membranes with extremely low levels of ionic and organic extractables and rapid rinse up of effluent high resistivity water, rendering them especially suited for filtration of fluids used in the manufacture of integrated circuits.

BACKGROUND OF THE INVENTION

Contaminant-free high resistivity water is critical to the fabrication of integrated circuits. Point-of-use filters are designed as the last opportunity to remove contaminants from the water used in integrated circuit manufacture. A point-of-use filter processes fluid which is to be utilized immediately in a localized manufacturing step. The manufacture of integrated circuits involves hundreds of steps in which silicon wafers are repeatedly exposed to processes such as lithography, etching, doping, and deposition of metals. Between these processing steps, numerous cleaning steps are also essential and they are accomplished through direct contact of the wafer with ultrapure water. Throughout all of these steps, the semiconductive nature of the silicon and its surface must be maintained and/or specifically controlled. Contamination can alter the semiconductive nature of the silicon or disturb the intended circuit design, thereby reducing the yield of integrated circuits. Point-of-use filters used for high resistivity water must, therefore, remove microparticulates without adding contaminants, i.e., exhibit low levels of ionic and total organic carbon (TOC) extractables. In addition, the effluent water from point-of-use filters must approach the level of purity of the influent as quickly as possible.

During the past decade, the microelectronics industry has advanced through miniaturization. Within the semiconductor industry it is believed that particles of more than one tenth of the line geometry on a microchip are capable of causing a defect. (See M. Yang and D. Tolliver, "Ultrapure Water Particle Monitoring for Advanced Semiconductor Manufacturing," Journal of Environmental Science, July/August, 1989.) The production of 4Mb chips with a minimum circuit feature size of 0.8 micron is imminent. (See R. J. Kopp, "Forecast 1991: Timing Is Key," Semiconductor International, January, 1991.) Particles as small as 0.1 micrometer may, therefore, lead to failure of a semiconductor element. A particle can prevent the completion of a line or a particle can bridge across two lines. Contamination can be either direct on the silicon surface or it may be a contamination of a masking surface, changing the circuit design which is printed.

Micro particles that contaminate high resistivity water are often generated in the distribution piping and tool plumbing of the circulation loop. As a result, point-of-use filters must be capable of retaining very fine particulates, such as cellular debris and pyrogens. Colloidal and oligomeric silica are known to pass through point-of-use filters and cause contamination. There silicon compounds are negatively charged in high purity deionized (DI) water. The result is that the silicon wafer attracts these silica particles. Oligomeric silica is known to contaminate water which is considered free of particles as fine as 0.1 micrometer. (See R. Iscoff, "Water Purity for the DRAM Generation," Semiconductor International, January, 1991). Dissolved contaminants such as humic acid, surfactants, and bacterial metabolites which pass through the filter to the silicon chips can also result in yield loss.

A filter membrane can achieve fluid clarification by different mechanisms. Particulate material can be removed through mechanical sieving wherein all particles larger than the pore diameter of the filter membrane are removed from the fluid. With this mechanism, filtration efficiency is controlled by the relative size of the contaminant and filter pore diameter. Accordingly, the efficient removal of very small particles, e.g., less than 0.1 micrometer in diameter, requires filter membranes with very small pore sizes. Such fine pore filter membranes tend to have the undesirable characteristics of high pressure drop across the filter membrane, reduced dirt capacity, and shortened filter life.

A filter may also remove suspended particulate material by adsorption onto filter membrane surfaces. Removal of particulate material by this mechanism is controlled by the surface characteristics of (1) the suspended particulate material and (2) the filter membrane. Most suspended solids which are commonly subjected to removal by filtration are negatively charged in aqueous systems. This feature has long been recognized in water treatment processes where cationic flocculating agents, oppositely charged to the suspended matter, are employed to improve settling efficiencies during water clarification through flocculation.

Colloid stability theory can be used to predict the interactions of electrostatically charged particles and surfaces. If the charges of suspended particle and the filter membrane surface are of like sign and with zeta potentials of greater than about 20mV, mutual repulsive forces will be sufficiently strong to prevent capture by adsorption. If the zeta potentials of the suspended particle and the filter membrane surface are small or, more desirably, of opposite sign, particles will tend to adhere to the filter membrane surfaces with high capture efficiencies. Microporous filter membranes characterized by positive zeta potentials are capable of removing negatively charged particles much smaller than the pore diameters of the membrane through the mechanism of electrostatic capture. Such membranes have potential applicability in the microelectronics industry since it is known that most particles encountered as contaminants in industrial practice have a negative zeta potential.

While membranes with a positive zeta potential offer significant advantages for retention of microparticulates, it is critical that these filters do not inadvertently introduce contaminants downstream of the filter. Extractables from point-of-use filters are a major concern in the microelectronics industry. Extractables are substances which may be potentially released from a filter element and contaminate its effluent. If such contaminants are deposited on silicon wafers, they cause a defect, resulting in a yield loss during the microchip fabrication process. As a result, industry practice is to test the resistivity of the effluent at the point-of-use filters. Only after the effluent has reached the level of purity of influent can the microchip washing and rinsing steps begin. The semiconductor industry requires deionized water having a resistivity approaching the theoretical maximum for water at 25° C., 18.3 megohm-cm. Current industry practice requires water having a minimum resistivity in the range of 17.8 to 18.1 megohm-cm. The production of water having resistivity of greater than 18 megohm-cm is complex, time consuming, and expensive. Therefore, effluent water flow from point-of-use filters must approach the level of purity of the influent as quickly as possible. In order to do this, the filters must not only retain particulate matter but they must also have a very low level of extractable material.

Ionic extractables, especially sodium, are worrisome to the semiconductor industry. Minuscule amounts of ionic species in ultrapure water can cause dramatic reductions in integrated circuit yield. Even very low concentrations, which would not show up in a resistivity test, can react with the ultrapure silicon wafer, thereby doping the silicon in an unwanted fashion.

Organic extractables must also be kept to a minimum. These are generally measured as total organic carbon (TOC). It is believed that organic extractables are absorbed on the surface of the wafer, causing defective crystallization during high temperature processing and in epitaxial growth. (See N. Hashimoto, K. Satou, T. Shinoda, K. Takino, "Manufacturing Equipment For Ultrapure Water For 16M Devices," Proceedings From The Ninth Annual Semiconductor Pure Water Conference, January, 1990.) Extremely low concentrations of TOC will not noticeably affect the effluent resistivity reading but may nonetheless be detrimental to yield output.

Nylon membrane filters having a positive charge have gained acceptance as point-of-use filters for ultrapure water. Nylon membranes which have been charge modified by a coating process involving amines and epoxide group-containing compounds have been suggested for use as point-of-use filters for ultrapure water. However, filters utilizing these membranes suffer from high levels of ionic extractables, such as sodium and chloride. As a result, their usefulness in the microelectronics industry is limited.

The membrane disclosed in U.S. Pat. No. 4,702,840 is a positively charged nylon membrane which has been prepared by cocasting the nylon polymer with a quaternary ammonium group-containing polymer. Filters utilizing these membranes have low extractables and high retention efficiencies but require cost prohibitive processing steps in order to manufacture filter elements that rinse up quickly in 18.2 megohm-cm ultrapure water. Since the microelectronics industry standards for ultrapure water have become more stringent there is a need for an improved filter which utilizes a positively charged microporous polymeric membrane that has high retention efficiency, low extractables, and a quick rinse up time in 18.2 megohm-cm ultrapure water.

SUMMARY OF THE INVENTION

It is an object of this invention to provide a cationically charged, microporous, hydrophilic membrane which has low extractables and fast effluent rinse up suitable for the filtration of ultrapure water used in the manufacture of microelectronics.

Another object of this invention is to provide a filter element having a cationically charged, hydrophilic, organic, polymeric, microporous membrane which has low extractables and fast effluent rinse up of ultrapure water, particularly 18.2 megohm-cm water.

Another object of this invention is to provide a process for the filtration of fluids, in particular the filtration of ultrapure water used in the manufacture of microelectronics.

This invention provides microporous membranes having narrow pore size distributions and pore ratings typically ranging from about 0.01 to about 1 micrometer or higher, preferably 0.02 to 0.2 micrometer, and efficient removal of contaminants ranging from molecular dimensions to particulates larger than the pore diameters. The membranes of this invention typically have film thicknesses in the range from about 0.01 to about 1.5 millimeters, preferably from about 0.025 to about 0.8 millimeter. The membranes of the present invention exhibit a strong positive zeta potential over a broad pH range, a characteristic that makes them useful for their enhanced filtration efficiency with a wide variety of contaminants including microparticulates, particularly very fine negatively charged particles, cellular debris, colloids, and endotoxins. Membranes of the present invention are capable of delivering high resistivity effluent water rapidly after the initiation of filtration, typically in thirty minutes or less as measured by the procedure described below. The ability to rapidly deliver such high purity effluent water, free from microparticulate and ionic contaminants, makes the products of this invention particularly desirable for the filtration of aqueous fluids employed in microelectronics manufacture.

The subject invention is directed to cationically charged, hydrophilic, microporous, polyamide membranes, a process for preparing them, and their use. The subject invention is also directed to filter elements comprising the cationically charged, hydrophilic, microporous, polyamide membranes. The membranes of this invention include a microporous polymeric substrate or matrix that has a polymeric material rich in quaternary ammonium groups which is covalently bonded to its surfaces. The polymeric material grafted to the surfaces of the substrate provides the membrane with a strong positive zeta potential across a wide pH range, it being particularly important that the membranes in accordance with this invention have positive zeta potentials in the vicinity of pH 7 and even under slightly alkaline conditions values such as pH 8. Terms such as "surface", "polymeric substrate surface", "membrane surface", or like terms, used in the singular or plural, are intended herein to include not only the gross surfaces, i.e., the external or outer surfaces, such as those which are exposed to view, but also the internal surfaces or those surfaces which define the pores of the polymeric substrate or medium; that is, the substrate or membrane surface comprises that portion of the polymeric substrate or membrane medium which is capable during use of being contacted by a fluid, particularly a liquid.

The membranes of this invention have surface properties which are substantially controlled by cationic, quaternary ammonium groups of the cationic, quaternary ammonium polymer grafted to the substrate surface area. Surprisingly, the membranes of this invention have a very strong positive zeta potential despite very small levels of grafted quaternary, ammonium-containing polymers. In addition to an excellent pore structure and positive zeta potential resulting from such small amounts of grafted quaternary ammonium polymer, these membranes have very low levels of extractable matter, a characteristic which is critically important in electronic filtration applications. The membranes of this invention have positive zeta potentials at neutral pH and in alkaline media, i.e., at pH 8, typically +5 millivolts or higher at pH 8. A range of from about +5 to about +15 millivolts at pH 8 is particularly desirable.

The covalent bonding between the quaternary ammonium-containing polymer and the polyamide substrate of the membranes of this invention is believed to lead to a reduction in the extractables available for sloughing off and being carried through the filter and into the effluent, a phenomenon believed to occur with coated membranes. As a result, the membranes of this invention have short rinse up times.

DESCRIPTION OF THE PREFERRED EMBODIMENTS

Membranes of this invention are made by grafting a quaternary ammonium-containing polymer to a polyamide substrate, preferably by means of ionizing radiation, to form a hydrophilic, microporous membrane comprising a hydrophilic, microporous, polyamide membrane substrate to the surfaces of which are grafted a polymer with quaternary ammonium groups made from diallyldimethylammonium chloride. Suitable substrates include any microporous polyamide membrane capable of forming covalent bonds with the quaternary ammonium group-containing polymer. Many such microporous polyamide membranes are known in the art and include those disclosed in U.S. Pat. No. 4,247,498 to Castro and U.S. Pat. No. 4,340,479 to Pall.

Preferred as the substrates of the present invention are the skinless, substantially alcohol-insoluble, hydrophilic, microporous, polyamide membranes described in U.S. Pat. No. 4,340,479 which is incorporated herein by reference. These membranes are composed of polyamides including polyhexamethylene adipamide, poly-ε-caprolactam, polyhexamethylene sebacamide, poly-7-aminoheptanoamide, polyhexamethylene azeleamide, or polytetramethylene adipamide. Mixtures of polyamides may also be used. Polyhexamethylene adipamide (nylon 66) is most preferred. A nylon 66 membrane material of this description is available from Pall Corporation under the tradename ULTIPOR N66®.

The membrane is saturated with a solution of the monomer in a solvent system and then exposed to a source of ionizing radiation. The quaternary ammonium-containing monomer used in the subject invention is characterized by having polymerizable ethylenic unsaturation, the monomer being diallyldimethylammonium chloride (DADMAC).

The solvent employed must not increase the level of extractable ionics and TOCs of the grafted substrate above that of the native substrate. A solvent or solvent system is employed which is inert to polymerization conditions and will not adversely affect the polymeric substrate nor the monomer employed while permitting a satisfactory polymerization. The preferred solvent is high resistivity deionized water.

The concentration of the monomer in the solution used to saturate or impregnate the microporous membrane substrate is important in obtaining the desired characteristics of the membrane product. The concentration should be high enough to provide the desired positive zeta potential over a range of pHs but particularly under neutral conditions and at pH 8. Conversely, the concentration should not be so high as to detract from the desired characteristics of a quick rinse up time of effluent ultrapure water and a very low level of extractable materials, i.e., higher concentrations which result in high levels of extractable materials or which adversely affect the effluent rinse up time of the media should be avoided. Surprisingly, quite low concentrations of the monomer may be used since it has been found that low concentrations of the quaternary ammonium group-containing polymer grafted to the surface of the membrane substrate are capable of completely converting the substrate surface to a positive zeta potential over a range of pHs.

Solutions of the monomer compound in the solvent as used in the present invention to prepare preferred membranes in accordance with this invention range in concentration of the monomer from greater than about 0.03 to less than about 0.15 weight percent, preferably about 0.05 to about 0.12 weight percent, and more preferably about 0.08 to about 0.1 weight percent, based on the total weight of solution.

Surprisingly, it has been found that the addition of ammonia to the monomer solution significantly reduces the effluent rinse up time of ultrapure water by the finished membrane. The ammonia is preferably present in a weight amount equal to the weight of the monomer in the solution. Preferred as a source of ammonia is ACS reagent grade ammonium hydroxide, available from JT Baker, Inc., which contains 28-30 weight percent ammonia. The solution of monomer, ammonia, and water should be mixed to ensure homogeneity.

The microporous membrane substrate can be saturated with the monomer solution by any appropriate means including conventional means known in the art. Regardless of the method used, it is important that contamination of the substrate and the monomer solution be prevented. All operations must be performed to prevent the introduction of particulate or chemical contaminants into the membrane and to ensure complete saturation with the monomer solution. It is believed, for instance, that residues in reaction vessels, ionics from human handling, and microparticulates from the air can contaminate both the substrate and the monomer solution, thereby adversely affecting the rinse up time of the finished product. Care should be taken to ensure that air bubbles do not remain in contact with the membrane.

Various methods of saturating the membrane with monomer solution may be employed. Flat sheets of membrane may be dipped in a bath of the monomer solution whereas continuous lengths of membrane may be saturated by known means of wet treatment of continuous, porous webs. The method of saturation used is best selected depending on the method of ionizing radiation treatment employed.

Batch-wise saturation simplifies the requirements for maintaining a contaminant free environment. One method which may be employed is immersion of a roll of medium (membrane) in a clean vessel containing monomer solution or, alternatively, monomer-containing solution may be passed through the roll of medium. The substrate is immersed for sufficient time to saturate or impregnate the polymeric substrate with the monomer solution, i.e., penetrate the pores of the substrate and completely wet the medium.

In another procedure, a continuous length of membrane may be passed through a bath containing the monomer solution.

Regardless of the manner in which the membrane is saturated with the monomer solution, the saturated membrane is thereafter exposed to ionizing radiation to effect graft polymerization. In the preferred manner, it is best to interleave the saturated web with a porous non-woven web. (If the membrane has been saturated in roll form already interleaved in this fashion then re-rolling is not necessary.) The interleaved roll is then placed in a container, preferably a stainless steel canister, containing sufficient monomer solution to maintain the roll in contact with liquid monomer solution during exposure to radiation. Any source of ionizing radiation can be used that is capable of initiating polymerization but preferred is a gamma radiation source such as $^{60}$-Cobalt.

The gamma radiation dosage should be sufficient to effect polymerization of the quaternary ammonium-containing monomer at the polymeric substrate while avoiding damage to the membrane substrate. Suitably, an exposure of from about 0.1 to about 2.5 megarads/hour, preferably about 0.2 to about 1 megarads/hour, and most preferably about 0.2 to about 0.5 megarads/hour is used for a typical irradiation period of about 2 to about 6 hours. A dose rate of about 0.5 megarads/hour and a total dose of about 3 megarads is especially preferred.

Other sources of radiation, such as electron beam, can be used to effect the grafting and polymerization process.

After irradiation, the positively-charged membrane must be washed with water to remove all polymer which is not covalently bound to the microporous substrate and residual monomer. Any technique which accomplishes this purpose may be used including batch-wise soaking of the membrane followed by draining or passing the washing agent through the porous membrane. The required washing agent is ultrapure water. For purposes of this invention the term "ultrapure water" is defined as deionized water which has a very high resistivity. Preferred as ultrapure water for purposes of rinsing the charged membrane is deionized water with a minimum resistivity of 17 megohm-cm. Especially preferred is deionized water with a resistivity of 18.2 megohm-cm. The washing procedure is preferably carried out at ambient temperature.

After washing, the medium may be dried by conventional means used in processing such media. Examples of suitable techniques include the use of an enclosed oven, an infrared oven, a tunnel oven, or by contact between the surface-modified substrate and a heated drum. As an alternative to drying, the medium may be stored wet for further processing into filter elements.

If the membrane is to be assembled into a filter element or cartridge, then care must be taken in handling the membrane to prevent contamination. In addition, the materials used in the filter element must be chosen so that there is no adverse effect on rinse up time and the level of extractables of the element. It is preferred that an additional washing step be performed whereby the elements are washed with ultrapure water. It has been found that this additional washing step results in filter elements having a faster rinse up time. Any known method of washing can be used. The preferred method is to pass ultrapure water through the elements at a rate of 0.25 to 1 gallon/minute for a period of about 16 hours. The washing step can be performed batch-wise for a number of elements. Flow should be in the direction of the intended flow through the elements during use.

The General Procedures and Examples below illustrate the preparation of membranes and filters having positive zeta potential, low levels of ionic and organic extractables, and rapid rinse up times to deliver effluent water having a resistivity of 18.2 megohms-cm. The invention may be susceptible to various modifications and alternative forms to the specific embodiments described in the Examples set forth below. It should be understood that these Examples are not intended to limit the invention to the particular forms disclosed but, on the contrary, the intention is to cover all modifications, equivalents, and alternatives falling within the spirit and scope of the invention.

Membranes in accordance with the subject invention were made into filter elements by the method described below and then tested for zeta potential and conductivity rinse up time by the following procedures.

GENERAL PROCEDURE FOR MEASURING ZETA POTENTIAL

Zeta potential is a measure of the net immobile electric charge on a membrane surface exposed to a fluid. The zeta potentials of membranes of this invention were derived from the streaming potential using the following formula (Davis et al, Interfacial Phenomena, Academic Press, New York, 1963):

$$\text{Zeta Potential} = \frac{4\pi\eta}{DP} \cdot E_s \lambda$$

where $\eta$ is the viscosity of the flowing solution, D is its dielectric constant, $\lambda$ is its conductivity, $E_s$ is the streaming potential, and P is the pressure drop across the membranes during the period of flow. In the following examples, the quantity $4\pi\eta/DP$ was equal to 0.8.

The streaming potential was measured using two superimposed layers of membrane in the form of disks 13 millimeters in diameter. The sample was placed in a filter holder which held the sample snugly between two 100 mesh (i.e., 100 wires in each direction per inch) platinum wire screens. The screens were electrically connected to the terminals of a Triplett Corporation Model 3360 Volt-Ohm Meter with copper wire. The screen on the upstream side of the sample was connected to the positive terminal of the meter while the downstream screen was connected to the negative terminal. A pH-buffered solution was flowed through the sample using a differential pressure of 45 inches of water column across the filter holder and the effluent was collected. For measurements at pH 8, a buffered solution was made by adding 8 milliliters pH 8 buffer (Fisher Scientific Co. catalogue number SB112-500) and 4 milliliters pH 9 buffer (Fisher Scientific Co. catalogue number SB114-500) to 1 liter pyrogen-free deionized water. After waiting 10 seconds for the electrical potential to stabilize, the electrical potential across the filter holder was measured during flow and was corrected for cell polarization by subtracting from it the electrical potential measured when flow stopped. During the period of flow, the pH of the liquid was measured using a Cole-Parmer Instrument Co. Model J-5994-10 pH meter fitted with an in-line model J-5993-90 pH probe. The conductivity of the liquid was measured using a Cole-Parmer Instrument Co. Model J-1481-66 conductivity flow cell. Then the polarity of the volt meter was reversed, and the effluent was flowed backwards through the filter holder using a differential pressure of 45 inches of water column. As in the first instance, the electrical potential was corrected for cell polarization by subtracting from it the electrical potential measured when flow stopped. The average of the two corrected streaming potentials was taken as the streaming potential.

General Procedure for Measuring Conductivity Rinse Up

The test filter element was mounted in a stainless steel cartridge housing and subjected to a flow of 18.2 megohm-cm water at a flow rate of approximately 2 gallons per minute at 20° C. The effluent water from the element was monitored for resistivity with a Thornton Associates Inc. Type 832 Resistivity Meter by external probe. The time in minutes required to reach an effluent resistivity of 18.2 megohm-cm was recorded. This time is referred to as "rinse up time".

General Method for the Preparation of Membranes in Examples 1–10

A roll of hydrophilic, microporous, nylon 66 polyamide membrane having a length of approximately 475 feet, a width of 10 3/8 inches, and a specified pore rating (as specified in each example below) was interleaved with REEMAY ® 2250, a spun bonded polyester web commercially available from Snow Filtration Company. Microporous, nylon 66 polyamide membranes of this type are available from Pall Corporation under the trade name ULTIPOR N66. The interleaved roll was placed in a clean 6 gallon polyethylene canister.

A monomer solution consisting of diallyldimethylammonium chloride (DADMAC, a product commercially available from Calgon, Inc.), an equal weight percent ammonia, and the balance 18.2 megohm-cm water was prepared in a clean 6 gallon polyethylene carboy which had been previously rinsed with 18.2 megohm-cm water. The solution was mixed to ensure homogeneity. The monomer solution was pumped into the canister containing the interleaved roll of medium at a rate of approximately 1.5 gallons/minute until the roll was covered by 2 inches of solution. The canister was then covered. The saturated roll was then irradiated with $^{60}$-Cobalt gamma radiation at 0.5 megarad/hour for 6 hours. The solution was then pumped out of the drum, and the interleaved roll was removed and washed by flowing 18.2 megohm-cm water through the roll tangentially across the membrane (along the longitudinal axis of the roll) for 16 hours under ambient temperature conditions at a flow rate of 0.5 gallons per minute. After washing, the roll was allowed to drain for 20 minutes. The interleaving was then removed and the medium drum dried. The dried medium was rolled up and stored in a polyethylene bag for processing into filter elements.

The test filter elements or cartridges used in the following examples were fabricated utilizing technology known to those skilled in the art for manufacturing cylindrical corrugated membrane filter cartridges. Specifically, a single layer of dry membrane was corrugated between two layers of an open (non-woven polyester) support and drainage material. The medium was cut into packs and assembled between a polypropylene core and a polypropylene cage. Polyester end caps were used for a fluid-tight seal.

EXAMPLES

EXAMPLE 1

A membrane was prepared according to the General Procedure described above using a polyamide membrane having a pore rating of 0.1 micrometer and a monomer solution consisting of 0.15 weight percent DADMAC and 0.15 weight percent ammonia. The membrane was fabricated using the method described above into a 10 inch single layer pleated filter cartridge with a surface area of 9 square feet. The filter elements produced from the membrane were washed by flowing 18.2 megohm-cm water through the elements at a rate of 0.5 gallon/minute for a period of 16 hours. The elements were then dried in a circulating air oven at 150° F. for 10 hours and stored in aluminized MYLAR ® bags. The zeta potential of the filter medium was measured according to the General Procedure For Measuring Zeta Potential disclosed above and found to be +15 millivolts at pH 8.0. This indicates that the filter medium has a positive charge in alkaline media. This is summarized in Table I below.

EXAMPLE 2

A filter cartridge was prepared in the same manner as that of Example 1 from a membrane prepared in the same manner as the membrane of Example 1 except that the monomer solution consisted of 0.1 weight percent of DADMAC and 0.1 weight percent ammonia. The zeta potential of the filter medium was measured according to the General Procedure For Measuring Zeta Potential described above and found to be +10 millivolts at pH 8.0. This indicates that the filter medium has a positive charge in alkaline media. This is summarized in Table I below.

EXAMPLE 3

A filter cartridge was prepared in the same manner as that of Example 2 from a membrane prepared in the same manner as the membrane of Example 2 except that a 0.2 micrometer pore size substrate membrane was used. The zeta potential of the filter medium was measured according to the General Procedure For Measuring Zeta Potential described above and found to be +9 millivolts at pH 8.0. This indicates that the filter medium has a positive charge in alkaline media. This is summarized in Table I below.

EXAMPLE 4

A filter cartridge was prepared in the same manner as that of Example 1 from a membrane prepared in the same manner as the membrane of Example 1 except that the monomer solution consisted of 0.08 weight percent of DADMAC and 0.08 weight percent ammonia. The zeta potential of the filter medium was measured according to the General Procedure For Measuring Zeta Potential described above and found to be +10 millivolts at pH 8.0. This indicates that the filter medium has a positive charge in alkaline media. This is summarized in Table I below.

EXAMPLE 5

A filter cartridge was prepared in the same manner as that of Example 1 from a membrane prepared in the same manner as the membrane of Example 1 except that the monomer solution consisted of 0.03 weight percent of DADMAC and 0.03 weight percent ammonia. The zeta potential of the filter medium was measured according to the General Procedure For Measuring Zeta Potential described above and found to be −15 millivolts at pH 8.0. This indicates that the filter medium has a negative charge in alkaline media. This is summarized in Table I below.

EXAMPLE 6, CONTROL

A hydrophilic microporous nylon 66 membrane having a pore size of 0.1 micrometer was prepared as disclosed in U.S. Pat. 4,340,479. The membrane was not subjected to a monomer grafting treatment. The membrane was fabricated into an element as described in Example 1 except that the element was not washed with ultrapure water. The zeta potential of the filter medium was measured according to the General Procedure For Measuring Zeta Potential described above and found to be −22 millivolts at pH 8.0. This indicates that the filter medium has a strong negative charge in alkaline media. This is summarized in Table I below.

As noted above, the zeta potentials of the filters of Examples 1–6 were determined with the results set out in Table I. The data indicate that grafting with a monomer solution having 0.08 weight percent DADMAC or greater produces a positively charged membrane.

TABLE I

| Example | Pore Diameter micrometers | DADMAC wt % | NH$_3$ wt % | Zeta Potential In mV at pH 8.0 |
|---|---|---|---|---|
| 1 | 0.1 | 0.15 | 0.15 | +15 |
| 2 | 0.1 | 0.1 | 0.1 | +10 |
| 3 | 0.2 | 0.1 | 0.1 | +9 |
| 4 | 0.1 | 0.08 | 0.08 | +10 |
| 5 | 0.1 | 0.03 | 0.03 | −15 |
| 6 | 0.1 | NA | NA | −22 |

The data in Table I indicate utilizing a monomer solution with about 0.08 to 0.15 weight percent added DADMAC and ammonia, the resulting membrane having a strong positive zeta potential. The data above also demonstrate that the present invention produces membranes with positive zeta potentials in alkaline pH. This result is highly desirable since a positively charged membrane provides enhanced filtration efficiency through electrostatic interaction between negatively charged particles and the filter medium. Furthermore, the data in Table 1 demonstrate that membranes with differing pore diameters can be prepared by this process. The membranes of the present invention have a strong positive charge compared to the membrane of Example 6, the Control membrane, a microporous, hydrophilic nylon 66 membrane made by the process of U.S. Pat. No. 4,340,479 which had not been grafted with DADMAC in the presence of ammonia.

EXAMPLE 7

A filter cartridge was prepared in the same manner as that of Example 2 from a membrane prepared in the same manner as the membrane of Example 2 except that the dose rate was 0.3 megarad/hour for 6 hours for a total dose of 1.8 megarads. The zeta potential of the filter medium was measured according to the General Procedure For Measuring Zeta Potential described above and found to be +14 millivolts at pH 8.0. This indicates that the filter medium has a positive charge in alkaline media. This is summarized in Table II below.

EXAMPLE 8

A filter cartridge was prepared in the same manner as that of Example 2 from a membrane prepared in the same manner as the membrane of Example 2 except that the dose rate of 0.1 megarad/hour for 6 hours for a total dose of 0.6 megarads. The zeta potential of the filter medium was measured according to the General Procedure For Measuring Zeta Potential described above and found to be +5 millivolts at pH 8.0. This indicates that the filter medium has a positive charge in alkaline media.

EXAMPLE 9

A filter cartridge was prepared in the same manner as that of Example 2 from a membrane prepared in the same manner as the membrane of Example 2 except that the monomer solution consisted of only 0.1 weight percent of DADMAC with the balance 18.2 megohm-cm water. The zeta potential of the filter medium was measured according to the General Procedure For Measuring Zeta Potential described above and found to be +14 millivolts at pH 8.0. This indicates that the filter medium has a positive charge in alkaline media. This is summarized in Table III below.

EXAMPLE 10

A filter cartridge was prepared in the same manner as that of Example 2 from a membrane prepared in the same manner as the membrane of Example 2 except that the post element fabrication washing step with ultrapure water was not performed. The zeta potential of the filter medium was measured according to the General Procedure For Measuring Zeta Potential described above and found to be +8 millivolts at pH 8.0. This indicates that the filter medium has a positive charge in alkaline media. This is summarized in Table III below.

The filters of Examples 1, 2, 4, 6, 9, and 10 were tested for their ability to deliver, within a short period of time after the onset of filtration, high purity effluent water of extremely low ionic content, a requirement for the filtration of electronics grade water. For comparative purposes, Example 6, the Control membrane, was included in the test evaluation. The times for the effluent of these membranes to reach a resistivity of 18.2 megohms-cm, as measured by the Conductivity Rinse Up Test described above, along with the zeta potentials for the membranes are also listed in Table III. The evaluation of these Examples was used to determine parameters necessary to produce a filter element with fast rinse up characteristics such as the upper limit of DADMAC in the monomer solution, whether ammonia needs to be added to the monomer solution, and whether washing the element with ultrapure water has any effect.

TABLE III

| Ex | DADMAC wt % | NH$_3$ wt % | Leached | Zeta Pot mV @ pH 8 | Rinse Up/min to 18.2 MΩ-cm |
|---|---|---|---|---|---|
| 1 | 0.15 | 0.15 | yes | +15 | >60 |
| 2 | 0.1 | 0.1 | yes | +10 | 25 |
| 4 | 0.08 | 0.08 | yes | +10 | 22 |
| 6 | NA | NA | NA | −22 | 14 |
| 9 | 0.1 | 0 | yes | +14 | 31 |
| 10 | 0.1 | 0.1 | no | +8 | 37 |

The data in Table III illustrate that the membranes of this invention have a novel combination of properties useful in the filtration of high resistivity water. The membranes of this invention have positive zeta potentials in neutral and alkaline media, and the ability to quickly deliver purified effluent of extremely low ionic content after the onset of filtration. This novel combination of properties makes the membranes and filters of the present invention highly desirable for point-of-use filtration of electronics grade water.

The data also show that although monomer solution with 0.15 weight percent DADMAC produces a positively charged membrane the rinse up time of the resulting product is unacceptably slow for use as a point-of-use micro filter for ultrapure water in microelectronics manufacture. This suggests that a desirable concentration of DADMAC in the monomer solution is lower than 0.15 weight percent and preferably about 0.1 weight percent or lower. The results further demonstrate that the addition of ammonia to the monomer formulation, surprisingly, improves the rinse up time. This is evident from a comparison of the data of Examples 2 and 9. A comparison of Examples 10 and 2 demonstrates the beneficial effect of leaching the fabricated filter elements with ultrapure water. While the element of Example 10 demonstrated a relatively fast rinse up time, the element of Example 2 has a rinse up time which is about 50% faster.

Industrial Application

Membranes in accordance with the subject invention have particular applicability in the filtration of ultrapure water used in highly sensitive applications, such as microelectronics. In such applications, the membranes will typically be used in the form of a filter structure comprising a support and the membrane. Particularly useful filter structures are filter elements or cartridges in the form of an end-capped structure such as that described above. It should be understood, however, that membranes in accordance with the invention may be used in other applications and in other forms, e.g., as supported disks and the like.

While the invention has been described in some detail by way of illustration and example, it should be understood that the invention is susceptible to various modifications and alternative forms and is not restricted to the specific embodiments set forth herein. Rather, it is intended to cover all modifications, equivalents, and alternatives falling within the spirit and scope of the invention.

We claim:

1. A hydrophilic, microporous membrane comprising a hydrophilic, microporous, polyamide membrane substrate to the surfaces of which are grafted through cavalent bonds, a polymer with quaternary ammonium groups made from diallyldimethylammonium chloride.

2. The membrane of claim 1 wherein the membrane has a positive zeta potential at pH 8.

3. The membrane of claim 2 wherein the membrane has a positive zeta potential of from about +5 to about +15 millivolts at pH 8.

4. The membrane of claim 3 wherein the rinse up time of the membrane is 30 minutes or less.

5. The membrane of claim 1 wherein the polyamide is selected from the group consisting of polyhexamethylene adipamide, poly-e-caprolactam, polyhexamethylene sebacamide, poly-7-aminoheptanoamide, polyhexamethylene azeleamide, polytetramethylene adipamide, and mixtures thereof.

6. The membrane of claim 5 wherein the polyamide is polyhexamethylene adipamide.

7. A filter structure comprising a support and the membrane of claim 2.

8. A filter cartridge or element comprising the membrane of claim 4 in the form of a layer between two layers of an open support and drainage material, all three layers of which are corrugated and positioned between a core and external housing with end caps for a fluid tight seal.

9. A hydrophilic, microporous membrane comprising a hydrophilic, microporous, polyhexamethylene adipamide membrane substrate to the surfaces of which are grafted through cavalent bonds, a polymer with quaternary ammonium groups made from diallyldimethylammonium chloride, the membrane having a positive zeta potential of from about +5 to about +15 millivolts at pH 8 and a rinse up time of less than about 30 minutes.

10. A method for preparing a hydrophilic, microporous membrane having a positive zeta potential at pH 8 comprising impregnating a hydrophilic, microporous, polyamide membrane substrate with a solution of diallyldimethylammonium chloride, subjecting the impregnated membrane substrate to ionizing radiation to graft the diallyldimethylammonium chloride to the surfaces of the microporous membrane substrate, and rinsing.

11. The method of claim 10 wherein the solution comprises water as the solvent and the monomer concentration is in the range of from greater than about 0.03 to less than about 0.15 weight percent based on the total weight of the solution.

12. The method of claim 11 wherein the monomer concentration is in the range of from about 0.05 to about 0.12 weight percent based on the total weight of the solution.

13. The method of claim 12 wherein the monomer concentration is in the range of from about 0.08 to about 0.1 weight percent based on the total weight of the solution.

14. The method of claim 10 wherein the solution also contains ammonia.

15. The method of claim 14 wherein the ammonia is present in the solution in a weight amount equal to the weight of the monomer.

16. The method of claim 10 wherein the source of the ionizing radiation is gamma radiation from $^{60}$-Cobalt.

17. The method of claim 16 wherein the exposure rate is from about 0.1 to about 2.5 megarads per hour.

18. The method of claim 10 wherein the rinsing step is carried out by passing ultrapure water through the microporous membrane.

19. The method of claim 18 wherein after the rinsing step the membrane is formed into a filter element or cartridge comprising a support and the rinsed membrane and another rinsing step is carried out on the formed filter element or cartridge to provide a filter element or cartridge wherein the membrane has a positive zeta potential of from about +5 to about +15 millivolts at pH 8 and a rinse up time of 30 minutes or less.

20. A method of filtration comprising passing a fluid through the membrane of claim 1.

21. The method of claim 20 wherein the fluid is high resistivity water.

22. A method of filtration comprising passing a fluid through the filter cartridge or element of claim 8.

23. The method of claim 22 wherein the fluid is high resistivity water.

24. A method of filtration comprising passing a fluid through the filter membrane of claim 9.

25. The method of claim 24 wherein the fluid is high resistivity water.

26. A method of filtration comprising passing high resistivity water through the filter element or cartridge of claim 8 at a point-of-use in electronics manufacture.

27. A method of filtration comprising passing high resistivity water through the membrane of claim 9 at a point-of-use in electronics manufacture.

* * * * *

UNITED STATES PATENT AND TRADEMARK OFFICE
CERTIFICATE OF CORRECTION

PATENT NO. : 5,128,041

DATED : July 7, 1992

INVENTOR(S) : PETER J. DEGEN, THOMAS C. GSELL AND JEFFREY K. CHAMBERS

It is certified that error appears in the above-identified patent and that said Letters Patent is hereby corrected as shown below:

ON THE TITLE PAGE:

[57] ABSTRACT

Line 4, delete "surraces" and substitute therefor -- surfaces --.

IN THE CLAIMS:

Column 13, line 44, delete "cavalent" and substitute therefor -- covalent --.

Column 14, line 4, delete "cavalent" and substitute therefor -- covalent --.

Signed and Sealed this

Sixteenth Day of November, 1993

Attest:

BRUCE LEHMAN

Attesting Officer

Commissioner of Patents and Trademarks